UNITED STATES PATENT OFFICE.

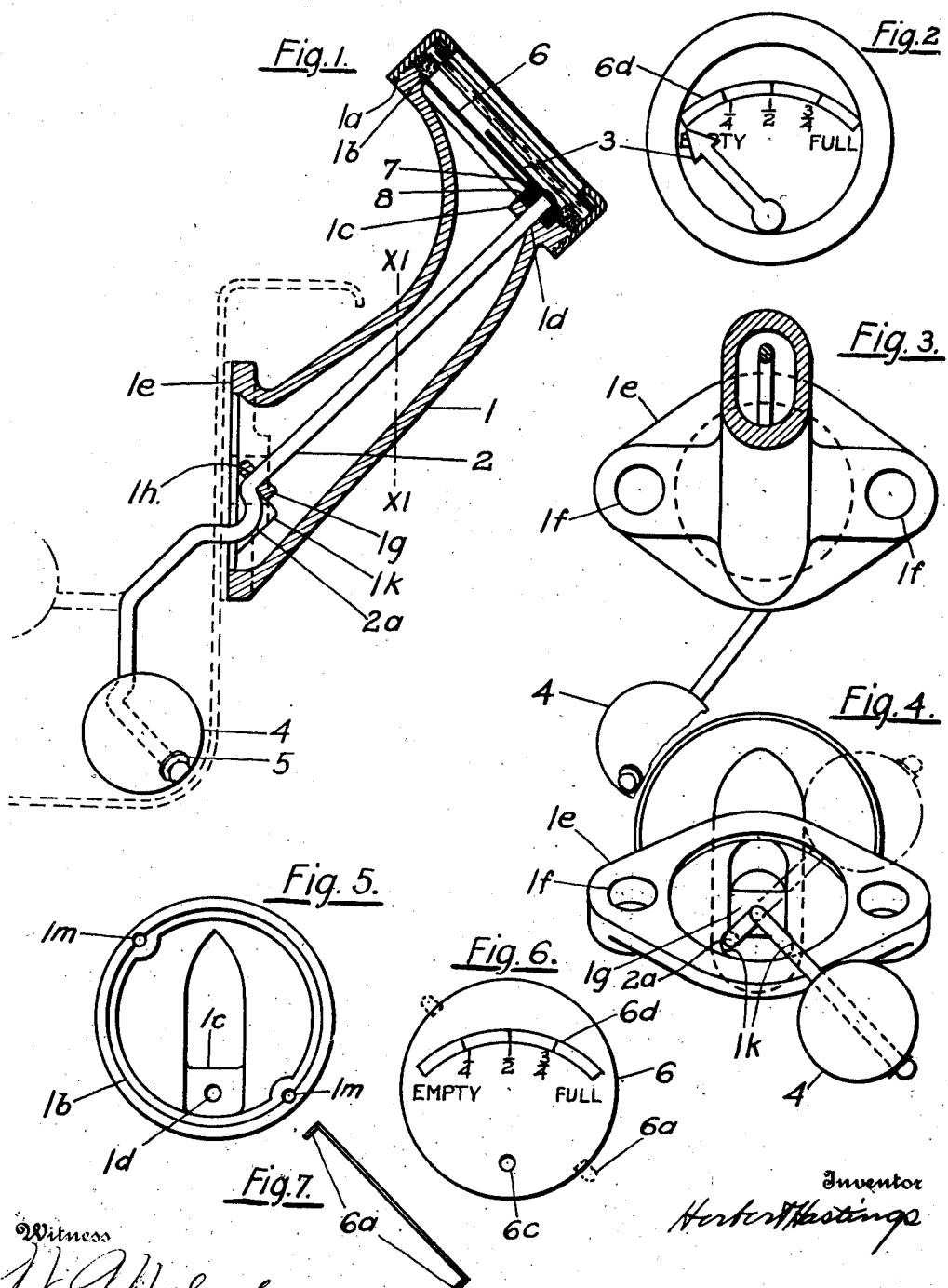

HERBERT HASTINGS, OF BRIGHTON, NEW YORK.

FLUID-LEVEL INDICATOR.

1,365,099.　　　　Specification of Letters Patent.　　Patented Jan. 11, 1921.

Application filed April 9, 1919. Serial No. 288,840.

*To all whom it may concern:*

Be it known that I, HERBERT HASTINGS, a citizen of the United States, residing at Brighton, in the county of Monroe and State of New York, have invented certain new and useful Improvements in Fluid-Level Indicators, of which the following is a specification.

This invention relates particularly to indicators such as may be used for indicating the level of the oil in the crank cases or oil pans of automotive motors but obviously may be used in other applications.

An object of the invention is to simplify the construction of such an indicator and to reduce to a minimum the number of parts which transmit the motion of the float to the pointer. Other objects and features of my invention will be apparent from the following description of the particular embodiment of my invention as described and illustrated in the accompanying drawings, in which—

Figure 1, is a partial sectional view in elevation, taken on the vertical central plane of one of my devices.

Fig. 2, is a plan view of the head of the device shown in Fig. 1, looking normally to the plane of the dial.

Fig. 3, is a partial sectional view in elevation, taken on the plane $X^1 X^1$ of Fig. 1.

Fig. 4, is a view of the instrument shown in Fig. 1, looking upwardly in a line parallel to the stem or rod therein.

Fig. 5, is a plan view of the head portion only of the body 1.

Fig. 6, is a plan view of the dial showing the integral ears in dotted lines.

Fig. 7, is a view looking at the edge of the dial and showing the ears down-turned.

Like characters of reference refer to like parts throughout the several views of the drawings.

1 is a convenient form of hollow body which is provided at its upper end with a circular head which is provided externally with screw threads $1^a$, and in the upper face with a circular recess $1^b$ and is also provided with a bearing boss $1^c$ spaced down from the recess $1^b$ and this boss is perforated at $1^d$; holes $1^m$ are also provided in the head near the periphery of the recess $1^b$ to receive the locating and retaining ears $6^a$ of the dial. The lower end of the body is provided with an enlarged flat flange portion $1^e$ which is provided with bolt holes $1^f$ adapted to receive bolts by which the body is held to the oil chamber or "pan", shown in dotted lines. There is also provided near the center of this flange portion, a bearing boss $1^g$ which is provided with a perforation $1^h$. Also at this end the inside wall of the casting is provided with stop recesses $1^k$ which are machined with a predetermined relation to the perforation $1^h$ for the purpose hereafter set forth.

2 is a pointer stem and float rod combined in a one piece unit, at its upper end it is adapted to receive a pointer 3, at its lower end it is adapted to receive a float 4 which is retained on the rod by a washer 5 through which the rod passes and outside of which the rod is flattened or upset to hold the washer against the float. Intermediate of the ends this rod is provided with an offset or crank portion $2^a$ the two fold purpose of which is to act as a means of limiting the angular travel of the stem by contacting with the stop recesses $1^k$ and also to act as a shoulder on the rod to bear against the under side of the boss $1^g$ to retain the stem from upward motion in the direction of its axis.

6 is a dial which is adapted to occupy the recess $1^b$ in the body and is provided with downwardly projecting, locating and retaining ears $6^a$ adapted to engage the holes $1^m$ in the body thus locating and attaching the dial in place thereon. The dial is also perforated at $6^c$ to allow the pointer stem to pass therethrough, and is provided with a graduated scale $6^d$ upon which are indicated markings corresponding with the position of the pointer at the relative float positions at the respective oil levels. The locating ears $1^m$ are projections on the dial provided in the blanking operation and are turned downwardly for the purpose above outlined.

7 is a spacing washer which surrounds the pointer stem directly underneath the pointer and has the double function of a spacer to position the pointer a predetermined distance above the dial, and of a thrust washer bearing against the dial to retain the pointer stem against downward motion in the direction of its axis.

8 is a compressible retaining washer surrounding the pointer stem and is compressed between the dial 6 and the bearing boss $1^c$ to restrain the passage of oil or vapor into the space above the dial.

The cap, glass and gasket assembly here shown is the same as shown in my previous application Serial No. 245,412 and therefore is not claimed as part of my present invention.

From the above it will be seen that as the surface of the liquid, on which the float is carried, rises, the float travels with it but since it is constrained to travel in a plane at right angle to the axis of the pointer stem and since the latter is free to revolve on this axis, the float rises and falls with the surface of the liquid but in a direction oblique therewith and thus operates to rotate the pointer stem proportional to the change in level of the liquid in which the float is suspended.

Having thus described my invention in general, what I claim as new and desire to secure by Letters Patent is

1. In a fluid level indicator, a body provided with journal bearings, a rod mounted to oscillate in said bearings and provided with an off-set portion for limiting the oscillation of the rod and also formed so as to support a float in an eccentric position relative to the axis of oscillation, a float attached thereto and a pointer attached to the rod.

2. A fluid level indicator comprising, a body provided with a journal bearing, a dial mounted on the body and spaced from said bearing, a pointer stem passing through the bearing and dial, a fluid retaining washer surrounding the stem and compressed against the stem and between the dial and bearing to resist the passage of fluid along the stem, a float and a pointer mounted on opposite ends of the stem.

In testimony whereof I affix my signature in the presence of two witnesses.

HERBERT HASTINGS.

Witnesses:
  RALPH J. SEXTON,
  EDNA M. CARMODY.